US012664770B2

(12) United States Patent
Choi et al.

(10) Patent No.: US 12,664,770 B2
(45) Date of Patent: Jun. 23, 2026

(54) METHOD AND APPARATUS WITH IMAGE RESTORATION

(71) Applicants:SAMSUNG ELECTRONICS CO., LTD., Suwon-si (KR); POSTECH Research and Business Development Foundation, Pohang-si (KR)

(72) Inventors: Jae Seok Choi, Suwon-si (KR); Jongmin Lee, Pohang-si (KR); Minsu Cho, Pohang-si (KR); Sanghyun Kim, Pohang-si (KR); Dahyun Kang, Pohang-si (KR); Insoo Kim, Suwon-si (KR); Geonseok Seo, Suwon-si (KR); Min Jung Lee, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 407 days.

(21) Appl. No.: 18/329,122

(22) Filed: Jun. 5, 2023

(65) Prior Publication Data

US 2024/0185589 A1      Jun. 6, 2024

(30) Foreign Application Priority Data

Dec. 6, 2022      (KR) ........................ 10-2022-0168433

(51) Int. Cl.
*G06V 10/00*        (2022.01)
*G06T 3/18*         (2024.01)
(Continued)

(52) U.S. Cl.
CPC .............. *G06V 10/806* (2022.01); *G06T 3/18* (2024.01); *G06V 10/771* (2022.01); *G06V 10/82* (2022.01)

(58) Field of Classification Search
CPC ........... G06N 3/02; G06N 3/08; G06N 3/042; G06N 3/045; G06N 3/047; G06N 3/082;
(Continued)

(56) References Cited

U.S. PATENT DOCUMENTS 9,990,536 B2      6/2018   Gren et al.
9,992,387 B2      6/2018   Jin et al.
(Continued)

FOREIGN PATENT DOCUMENTS

KR            10-2317007 B1      10/2021

OTHER PUBLICATIONS

Bhat, Goutam, et al. "Deep burst super-resolution." *Proceedings of the IEEE/CVF Conference on Computer Vision and Pattern Recognition.* (2021). pp. 9209-9218.
(Continued)

*Primary Examiner* — Amir Alavi
(74) *Attorney, Agent, or Firm* — NSIP Law

(57)      ABSTRACT

A method and apparatus for image restoration using burst images are provided, where the method includes receiving a burst image set including image frames, determining shifted data representing a shift level of each of the image frames using a shift estimation model, selecting a base image from the image frames based on the shifted data, and performing image restoration by synthesizing at least a portion of the image frames based on the base image.

20 Claims, 7 Drawing Sheets

(51) Int. Cl.
    *G06V 10/771*     (2022.01)
    *G06V 10/80*     (2022.01)
    *G06V 10/82*     (2022.01)

(58) Field of Classification Search
    CPC ...... G06N 3/088; G06N 3/092; G06N 3/0454;
              G06N 3/0475; G06N 3/0464; G06V
              10/82; G06V 10/761; G06V 10/762;
             G06V 10/806; G06V 10/771; G06T 3/18;
                              G06T 5/00
    See application file for complete search history.

(56) References Cited

U.S. PATENT DOCUMENTS

| | | | | |
|---|---|---|---|---|
| 10,482,572 | B2 * | 11/2019 | Hotson | G06V 20/58 |
| 10,771,697 | B2 | 9/2020 | Hubel et al. | |
| 11,282,225 | B2 * | 3/2022 | Klimovich | G01C 21/30 |
| 11,601,661 | B2 * | 3/2023 | Jiang | H04N 19/82 |
| 11,875,516 | B2 * | 1/2024 | Feng | G06V 10/443 |
| 12,086,212 | B2 * | 9/2024 | Choi | G06V 10/462 |
| 12,373,922 | B2 * | 7/2025 | Dudhane | G06T 3/4076 |
| 2023/0186432 | A1 * | 6/2023 | Choi | G06V 10/806 |
| | | | | 382/156 |
| 2024/0135496 | A1 * | 4/2024 | Dudhane | G06T 5/50 |
| 2024/0185589 | A1 * | 6/2024 | Choi | G06V 10/82 |

OTHER PUBLICATIONS

Bhat, Goutam, et al. "Deep reparametrization of multi-frame super-resolution and denoising." *Proceedings of the IEEE/CVF International Conference on Computer Vision.* (2021). pp. 2460-2470.

Dudhane, Akshay, et al. "Burst image restoration and enhancement." *Proceedings of the IEEE/CVF Conference on Computer Vision and Pattern Recognition.* (2022). pp. 5759-5768.

Dai, Jifeng, et al. "Deformable convolutional networks." *Proceedings of the IEEE international conference on computer vision.* (2017). pp 764-773.

Griffin, Brent A., et al. "Bubblenets: Learning to select the guidance frame in video object segmentation by deep sorting frames." *Proceedings of the IEEE/CVF Conference on Computer Vision and Pattern Recognition.* (2019). pp. 8914-8923.

Dahary, Omer, et al. "Digital gimbal: End-to-end deep image stabilization with learnable exposure times." *Proceedings of the IEEE/CVF Conference on Computer Vision and Pattern Recognition.* (2021). pp. 11936-11945.

Kalantari, Nima Khaderni, et al. "Deep hdr video from sequences with alternating exposures." *Computer graphics forum.* vol. 38. No. 2. (2019), pp. 1-13.

Mildenhall, Ben, et al. "Burst denoising with kernel prediction networks." *Proceedings of the IEEE conference on computer vision and pattern recognition.* (2018). pp. 2502-2510.

Guo, Shi, et al. "Toward convolutional blind denoising of real photographs." *Proceedings of the IEEE/CVF conference on computer vision and pattern recognition.* (2019). pp. 1712-1722.

Kim, Yoonsik, et al. "Transfer learning from synthetic to real-noise denoising with adaptive instance normalization." *Proceedings of the IEEE/CVF conference on computer vision and pattern recognition.* (2020). pp. 3482-3492.

Dosovitskiy, Alexey, et al. "Flownet: Learning optical flow with convolutional networks." *Proceedings of the IEEE international conference on computer vision.* (2015). pp. 2758-2766.

Ranjan, Anurag, et al. "Optical flow estimation using a spatial pyramid network." *Proceedings of the IEEE conference on computer vision and pattern recognition.* (2017). pp. 4161-4170.

Long, Gucan, et al. "Learning image matching by simply watching video." *Computer Vision—ECCV 2016: 14th European Conference, Amsterdam, The Netherlands*, Oct. 11-14, 2016, *Proceedings*, Part VI 14. Springer International Publishing, (2016). pp 1-21.

Sun, Deqing, et al. "Pwc-net: Cnns for optical flow using pyramid, warping, and cost volume." *Proceedings of the IEEE conference on computer vision and pattern recognition.* (2018). pp. 8934-8943.

* cited by examiner

Burst image set
101

METHOD AND APPARATUS WITH IMAGE RESTORATION

CROSS-REFERENCE TO RELATED APPLICATION

This application claims the benefit under 35 USC § 119(a) of Korean Patent Application No. 10-2022-0168433, filed on Dec. 6, 2022, in the Korean Intellectual Property Office, the entire disclosure of which is incorporated herein by reference for all purposes.

BACKGROUND

1. Field

The following description relates to a method and apparatus for image restoration using burst images.

2. Description of Related Art

Image restoration may involve restoring an image of degraded quality to an image of improved quality. In some examples, image restoration may be performed using a deep learning-based neural network. The neural network may be trained based on deep learning, and then perform inference by mapping input data and output data that are in a nonlinear relationship to each other. The ability of the trained neural network to generate such a mapping may be referred to as a learning ability of the neural network. A neural network trained for a special purpose, such as image reconstruction, may have an ability to generate a relatively accurate output in response to an input pattern that it is not used for the training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented image restoration method, including receiving a burst image set including image frames, determining shifted data representing a shift level of each of the image frames using a shift estimation model, selecting a base image from the image frames based on the shifted data, and performing image restoration by synthesizing at least a portion of the image frames based on the base image.

The determining of the shifted data may include generating optical flow map sets of the image frames including a first optical flow map set representing an optical flow between a first image frame of the image frames and another image frame of the image frames using the shift estimation model, determining representative values of the optical flow map sets including a first representative value of the first optical flow map set, and determining the shifted data based on the representative values.

The first optical flow map set may include optical flow maps including a first optical flow map representing a first optical flow between the first image frame and a second image frame of the image frames, and a second optical flow map representing a second optical flow between the first image frame and a third image frame of the image frames.

The determining of the representative values may include determining a first spatial mean value and a second spatial mean value according to spatial averaging of dimensions of the first optical flow map and the second optical flow map, respectively, determining a pair-wise averaging result according to pair-wise averaging of the first spatial mean value and the second spatial mean value, and determining a first representative value representing the first image frame from among the representative values based on the pair-wise averaging result.

The image restoration method may include determining noise data representing a noise level of each of the image frames using a noise estimation model.

The selecting of the base image may include selecting the base image from the image frames based on the shifted data and the noise data.

Each of the noise estimation model and the shift estimation model may be based on a neural network.

The image restoration method may include determining a degradation score of each of the image frames based on the shifted data, and forming a synthesis group with a portion of the image frames based on the degradation score of each of the image frames.

The performing of the image restoration may include synthesizing the image frames of the synthesis group based on the base image.

The image frames may include a first image frame and a second image frame, and the first image frame may be selected as the base image, and the performing of the image restoration may include generating a first feature map of the first image frame, generating an optical flow between the first image frame and the second image frame, generating a second feature map of the second image frame, generating a second warping result by warping the second feature map with the optical flow, and fusing the first feature map and the second warping result.

The performing of the image restoration may include determining a first weight of the first feature map and a second weight of the second feature map, and the fusing of the first feature map and the second warping result may include fusing the first feature map and the second warping result based on the first weight and the second weight.

In another general aspect, there is provided an image restoration apparatus, including a processor configured to receive a burst image set including image frames, determine shifted data representing a shift level of each of the image frames using a shift estimation model, select a base image from the image frames based on the shifted data, and perform image restoration by synthesizing at least a portion of the image frames based on the base image.

To determine the shifted data, the processor may be configured to generate optical flow map sets of the image frames including a first optical flow map set representing an optical flow between a first image frame of the image frames and another image frame of the image frames using the shift estimation model, determine representative values of the optical flow map sets including a first representative value of the first optical flow map set, and determine the shifted data based on the representative values.

The first optical flow map set may include optical flow maps including a first optical flow map representing a first optical flow between the first image frame and a second image frame of the image frames, and a second optical flow map representing a second optical flow between the first image frame and a third image frame of the image frames.

To determine the representative values, the processor may be configured to determine a first spatial mean value and a second spatial mean value according to spatial averaging of dimensions of the first optical flow map and the second optical flow map, respectively, determine a pair-wise averaging result according to pair-wise averaging of the first spatial mean value and the second spatial mean value, and determine a first representative value representing the first image frame from among the representative values based on the pair-wise averaging result.

The processor may be configured to determine noise data representing a noise level of each of the image frames using a noise estimation model, and select the base image from the image frames based on the shifted data and the noise data.

In another general aspect, there is provided an electronic device, including a sensor configured to generate a burst image set including image frames, and a processor configured to determine shifted data representing a shift level of each of the image frames by using a shift estimation model, select a base image from the image frames based on the shifted data, and perform image restoration by synthesizing at least a portion of the image frames based on the base image.

To determine the shifted data, the processor may be configured to generate optical flow map sets of the image frames including a first optical flow map set representing an optical flow between a first image frame of the image frames and another image frame of the image frames using the shift estimation model, determine representative values of the optical flow map sets including a first representative value of the first optical flow map set, and determine the shifted data based on the representative values.

The first optical flow map set may include an optical flow maps including a first optical flow map representing a first optical flow between the first image frame and a second image frame of the image frames, and a second optical flow map representing a second optical flow between the first image frame and a third image frame of the image frames, and to determine the representative values, the processor may be configured to determine a first spatial mean value and a second spatial mean value according to spatial averaging of dimensions of the first optical flow map and the second optical flow map, respectively, determine a pair-wise averaging result according to pair-wise averaging of the first spatial mean value and the second spatial mean value, and determine a first representative value representing the first image frame from among the representative values based on the pair-wise averaging result.

Other features and aspects will be apparent from the following detailed description, the drawings, and the claims.

Figure 1:
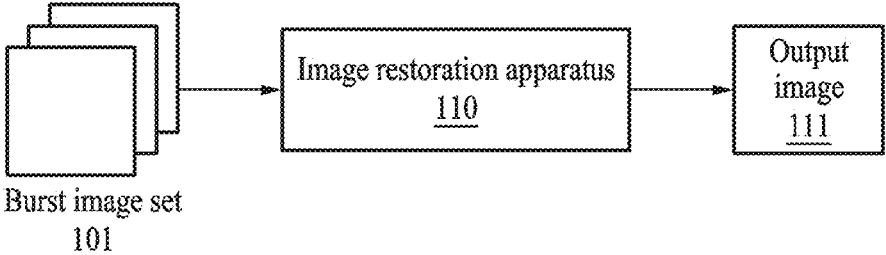
FIG. 1 illustrates an example of an image restoration operation using a burst image set.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an image restoration operation using a burst image set. Referring to FIG. 1, an image restoration apparatus 110 may receive a burst image set 101 including a plurality of image frames. The plurality of image frames may be obtained by continuously photographing for a period of time. In some examples, the period of time may be preset. The image restoration apparatus 110 may perform image restoration by synthesizing the burst image set 101. An output image 111 may correspond to a result of the image restoration. The burst image set 101 may include various degradations and/or corruptions such as, for example, shift, noise, blur, and low-light.

The image restoration apparatus 110 may select a base image from the burst image set 101 and synthesize a plurality of image frames based on the base image. In some examples, the image restoration apparatus 110 may select the base image based on at least a portion of a shift level and a noise level. In some examples, an image frame having a low shift level and a low noise level may be selected as the base image.

The image restoration apparatus 110 may generate shifted data representing a shift level of each of a plurality of image frames by using a neural network-based shift estimation model, and generate noise data representing a noise level of each of the plurality of image frames by using a neural network-based noise estimation model.

In some examples, the neural network may include a plurality of layers. The plurality of layers may include an input layer, at least one hidden layer, and an output layer. In the neural network layer, an input image or map may be convoluted with a filter called a kernel, and as a result, a plurality of feature maps may be output. The output feature maps may be again convoluted in a subsequent convolutional layer as input feature maps with another kernel, and a plurality of new feature maps may be output. After the convolution operations are repeatedly performed, and potentially, other layer operations performed, the recognition or classification results of features of the input image through the neural network may be output.

The neural network or deep neural network (DNN) may generate mapping between input information and output information, and may have a generalization capability to infer a relatively correct output with respect to input information that has not been used for training. The neural network may refer to a general model that has an ability to solve a problem or perform tasks, as non-limiting examples, where nodes arranged in layers form the network through connections and other parameters are adjusted through training.

In some examples, training an artificial neural network may indicate determining and adjusting weights and biases between layers or weights and biases among a plurality of nodes belonging to different layers adjacent to one another, as only non-limiting examples of such parameters.

A neural network may include a deep neural network (DNN) including a plurality of layers. The DNN may include any one or any combination of a fully connected network (FCN), a convolutional neural network (CNN), a restricted Boltzmann machine (RBM), a deep belief network (DBN), a bidirectional recurrent DNN (BRDNN), a deep Q-network, a recurrent neural network (RNN), or a combination of two or more thereof, but examples thereof are not limited to the foregoing examples. For example, at least a portion of the layers included in the neural network may correspond to a CNN, and another portion of the layers may correspond to an FCN. The CNN may be referred to as convolutional layers, and the FCN may be referred to as fully connected layers.

The neural network may be trained based on deep learning and perform inference suitable for a training purpose by mapping input data and output data that are in a nonlinear relationship to each other. Deep learning is a machine learning technique for solving an issue such as image or speech recognition from a big data set. Deep learning may be understood as a process of solving an optimization issue to find a point at which energy is minimized while training a neural network based on prepared training data. Through supervised or unsupervised learning of deep learning, a structure of the neural network or a weight corresponding to a model may be obtained, and the input data and the output data may be mapped to each other through the weight. When a width and a depth of the neural network are sufficiently large, the neural network may have a capacity sufficient to implement a predetermined function. The neural network may achieve an optimized performance when learning a sufficiently large amount of training data through an appropriate training process.

The neural network may be expressed as being trained in advance, where "in advance" means before the neural network "starts". That the neural network "starts" may indicate that the neural network is ready for inference. For example, the "start" of the neural network may include the neural network being loaded into a memory, or the input data for inference being input into the neural network after the neural network is loaded into the memory.

Figure 2:
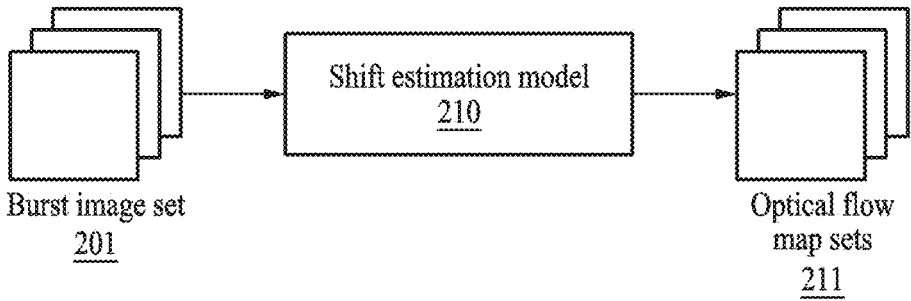
FIG. 2 illustrates an example of a shift estimation operation.

FIG. 2 illustrates an example of a shift estimation operation. Referring to FIG. 2, a shift estimation model 210 may generate optical flow map sets 211 based on a burst image set 201. Optical flow may represent a motion of corresponding pixels in given images. The corresponding pixels may be pixels representing the same object in different frames of the given images. One optical flow map set of the optical flow map sets 211 may be generated according to one image frame of the burst image set 201.

In some examples, each optical flow map set may include a plurality of optical flow maps each representing an optical flow between image frame pairs. For example, the optical flow map sets 211 may include a first optical flow map set according to a first image frame of the burst image set 201. The first optical flow map set may include first optical flow maps representing an optical flow between the first image frame and another image frame. For example, the first optical flow maps may include a 1-1 optical flow map representing an optical flow between the first image frame and a second image frame, and a 1-2 optical flow map representing an optical flow between the first image frame and a third image frame. The number of optical flow maps included in each optical flow map set may be variously determined. For example, each optical flow map set may include one optical flow map between adjacent image frames or N–1 optical flow maps between possible pairs of image frames. N may represent the number of image frames of the burst image set 201.

In some examples, representative values of each optical flow map set may be determined, and shifted data of the image frames of the burst image set 201 may be determined based on the representative values.

Figure 3:
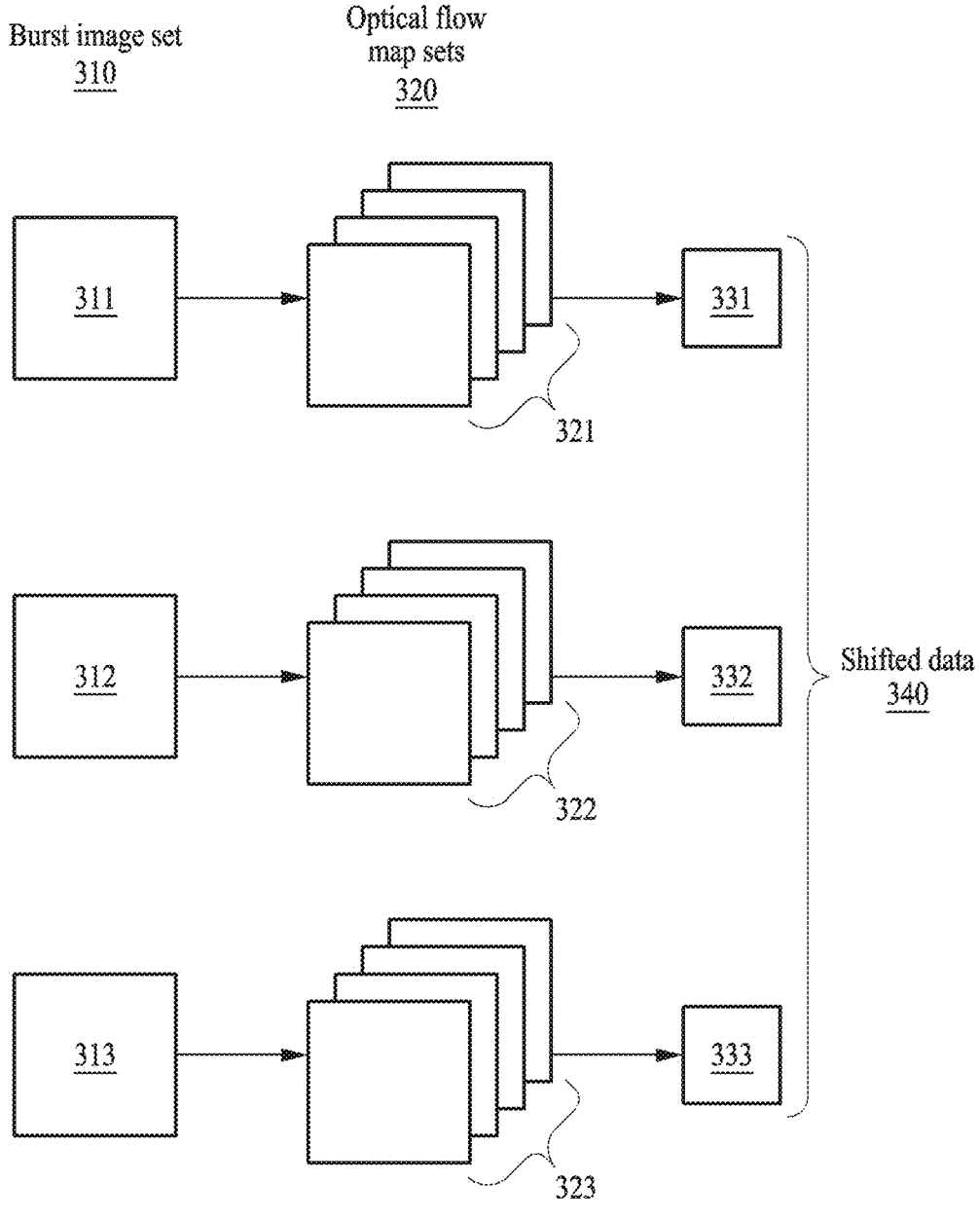
FIG. 3 illustrates an example of a process of deriving shifted data from a burst image set.

FIG. 3 illustrates an example of a process of deriving shifted data from a burst image set. Referring to FIG. 3, optical flow map sets 320 corresponding to a burst image set 310 may be generated through a shift estimation model. The burst image set 310 may include a first image frame 311, a second image frame 312, and a third image frame 313, and the optical flow map sets 320 may include a first optical flow map set 321, a second optical flow map set 322, and a third optical flow map set 323. The number of image frames and the number of optical flow map sets 320 may be represented by N. An example of three image frames and three optical flow map sets 320 is illustrated in FIG. 3, but N may be 2 or 4 or more.

The dimension of the burst image set 310 may be N*C1*H*W. N may represent the number of image frames, C1 may represent the number of channels, H may represent height, and W may represent width. For example, a 2*2 color filter array (CFA) may be used, and C1 may be 2*2=4. The dimension of the optical flow map sets 320 corresponding to an output of the shift estimation model may be N*(N–1)*C2*H*W. C2 may correspond to the dimension of a motion vector of the optical flow map. For example, C2 may be 2 when the motion vector corresponds to two-dimensional data of x and y. N–1 may correspond to the number of image frame pairs serving as a basis for the optical flow map. For example, each image frame may form an image frame pair with each of the other image frames other than itself. For example, the first image frame 311 may form a first image frame pair with the second image frame 312, and form a second image frame pair with the third image frame 313. N–1 optical flow maps may be formed for each of the N image frames, and the dimension of each optical flow map may be C2*H*W.

Shifted data 340 may be determined through representative values 331, 332, and 333 of the optical flow map sets 320. The representative values 331, 332, and 333 may correspond to shift levels of the image frames of the burst image set 310. The first representative value 331 may represent a shift level of the first image frame 311, the second representative value 332 may represent a shift level of the second image frame 312, and the third representative value 333 may represent a shift level of the third image frame 313.

The representative values 331, 332, and 333 may be determined by averaging the optical flow map sets 320. Averaging of the optical flow map sets 320 may include spatial averaging and pair-wise averaging. An example in which averaging is performed in the order of spatial averaging and pair-wise averaging is described below. In another example, averaging may be performed in the order of pair-wise averaging and spatial averaging.

The spatial averaging may be performed for each optical flow map of each optical flow map set 320. When the dimension of an optical flow map is C2*H*W, a spatial averaging result may be determined through spatial averaging of the C2*H*W optical flow map. Each optical flow map set may have a dimension of (N–1)*C2*H*W, and the spatial averaging result of each optical flow map set may have a dimension of N–1. The spatial averaging result may include N–1 spatial average values. For example, a first spatial averaging result having a dimension of N–1 may be determined according to spatial averaging of the first optical flow map set 321, and the spatial averaging result may include N–1 spatial average values.

The pair-wise averaging may be performed on spatial averaging results of each optical flow map set. A spatial averaging result having a dimension of N–1 may be generated according to spatial averaging of each optical flow map set. A pair-wise averaging result may be generated through averaging of N–1 spatial mean values. N–1 represents the number of image frame pairs, and the pair-wise averaging result may be generated through pair-wise averaging of the image frame pairs. The pair-wise averaging result for each spatial averaging result may correspond to each representative value. For example, the pair-wise averaging result for the first spatial averaging result of the first optical flow map set 321 may correspond to the first representative value 331, the pair-wise averaging result for a second spatial averaging result of the second optical flow map set 322 may correspond to the second representative value 332, and the pair-wise averaging result for a third spatial averaging result of the third optical flow map set 323 may correspond to the third representative value 333.

The shifted data 340 may be determined based on the representative values 331, 332, and 333. The shifted data 340 may have a dimension of N. Each shifted value of the shifted data 340 may represent a shift level of each of the image frames 311, 312, and 313. For example, the averaging result of the first optical flow map set 321 of the first image frame 311 may represent a distance by which an image frame has been shifted from a virtual center point of the plurality of frames 311, 312, and 313 of the burst image set 310. An image frame having the lowest shift level may correspond to an image frame closest to the virtual center point.

Figures 4, 5:
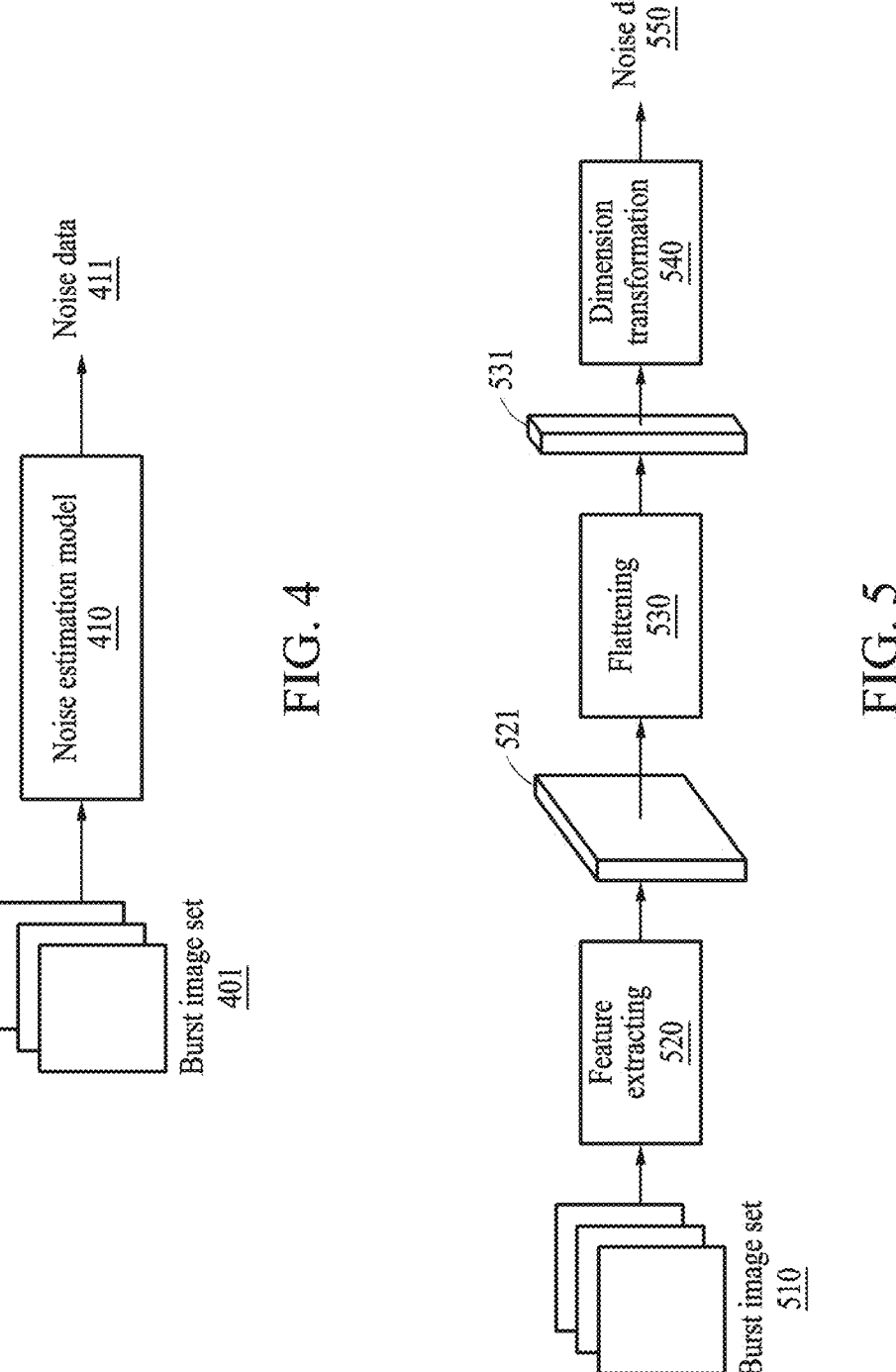
FIG. 4 illustrates an example of a noise estimation operation.
FIG. 5 illustrates an example of a process of deriving noise data from a burst image set.

FIG. 4 illustrates an example of a noise estimation operation. Referring to FIG. 4, a noise estimation model 410 may generate noise data 411 based on a burst image set 401. The noise data 411 may represent a noise level of each of a plurality of image frames of the burst image set 401.

FIG. 5 illustrates an example of a process of deriving noise data from a burst image set. Referring to FIG. 5, the noise estimation model may estimate a noise map 521 by performing a feature extracting operation 520 on a burst image set 510. The dimension of the burst image set 510 may be N*C1*H*W. N may represent the number of image frames, C1 may represent the number of channels, H may represent height, and W may represent width. The dimension of the noise map 521 may be N*C1*H*W. The noise estimation model may generate a noise vector 531 by performing a flattening operation 530 on the noise map 521. The dimension of the noise vector 531 may be N*C. C may represent the number of vector channels. The noise estimation model may generate noise data 550 by performing a dimension transformation operation 540 on the noise vector 531. The dimension of the noise data 550 may be N. Each noise value of the noise data 550 may represent a noise level of each image frame of the burst image set 510.

Figure 6:
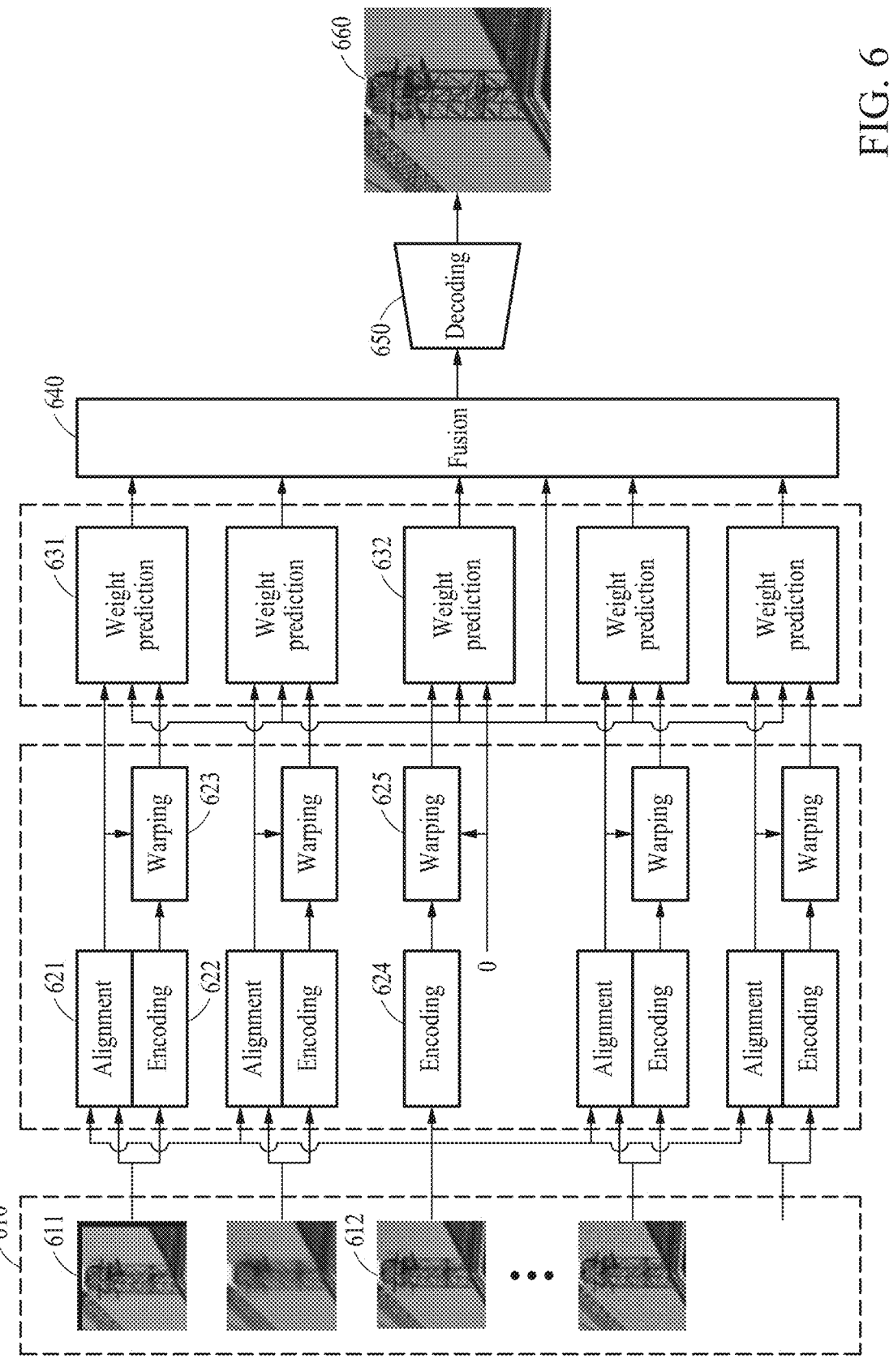
FIG. 6 illustrates an example of a synthesis operation using base images.

FIG. 6 illustrates an example of a synthesis operation using base images. Referring to FIG. 6, an output image 660 may be generated by synthesizing a plurality of image frames of a burst image set 610. A third image frame 612 may be selected as a base image from among the plurality of image frames.

An image restoration apparatus may generate an optical flow between a first image frame 611 and the third image frame 612 through an alignment operation 621, generate a first feature map of the first image frame 611 through an encoding operation 622, and generate a first warping result by warping the first feature map with the optical flow through a warping operation 623. The image restoration apparatus may generate a third feature map of the third image frame 612 through an encoding operation 624. Since the third image frame 612 is a base image, the image restoration apparatus may generate a third warping result by warping the third feature map with an optical flow corresponding to warping operation 625. Alignment, encoding, and warping may also be performed on other image frames of the burst image set 610. A neural network-based encoding model may be used for the encoding, and a neural network-based alignment model may be used for the alignment.

The image restoration apparatus may fuse the warping results of the burst image set 610 through a fusion operation 640 and decode the fusion result through a decoding operation 650, to generate an output image 660. The output image 660 may correspond to a result of the restoration. The decoding may be performed based on a neural network-based decoding model.

In some examples, the image restoration apparatus may fuse the warping results using weights for the feature maps of each image frame. The image restoration apparatus may predict a first weight for a first warping result through a weight prediction operation 631, and predict a third weight for a third warping result through a weight prediction operation 632. The weight prediction may be performed based on a neural network-based weight prediction model. The image restoration apparatus may perform the fusion operation 640 based on the weight of each warping result.

Figure 7:
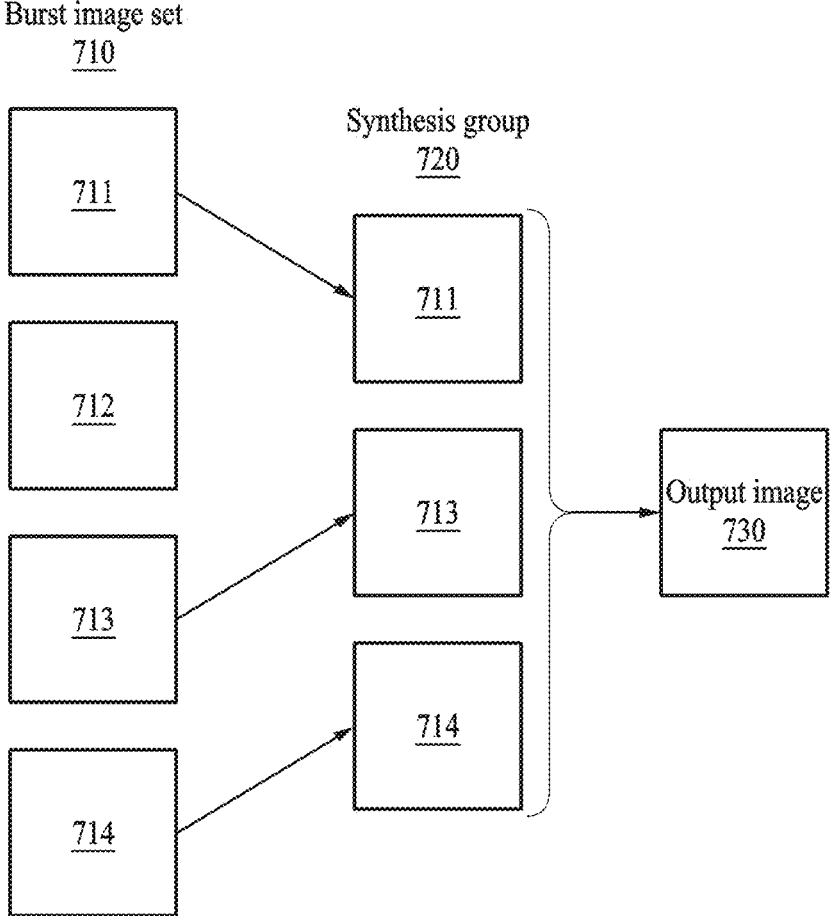
FIG. 7 illustrates an example of a synthesis operation using a synthesis group formed based on a degradation score.

FIG. 7 illustrates an example of a synthesis operation using a synthesis group formed based on a degradation score. Referring to FIG. 7, burst image sets 710 may include a plurality of image frames 711 to 714, and a synthesis group 720 may be formed of a portion of the plurality of image frames 711 to 714 based on degradation scores of each of the plurality of image frames 711 to 714. FIG. 7 illustrates an example in which the second image frame 712 is dropped and the first image frame 711, the third image frame 713, and the fourth image frame 714 are selected as a synthesis group. The degradation score may be determined according to a shift level and/or a noise level of each of the image frames 711 to 714. An image frame with a low degradation score may be selected for the synthesis group 720, and an image frame with a high degradation score may be dropped. An image restoration apparatus may generate an output image 730 by synthesizing the image frames 711, 713, and 714 of the synthesis group 720 based on the base image. The base image may belong to the synthesis group 720 and may have the lowest degradation score.

Figure 8:
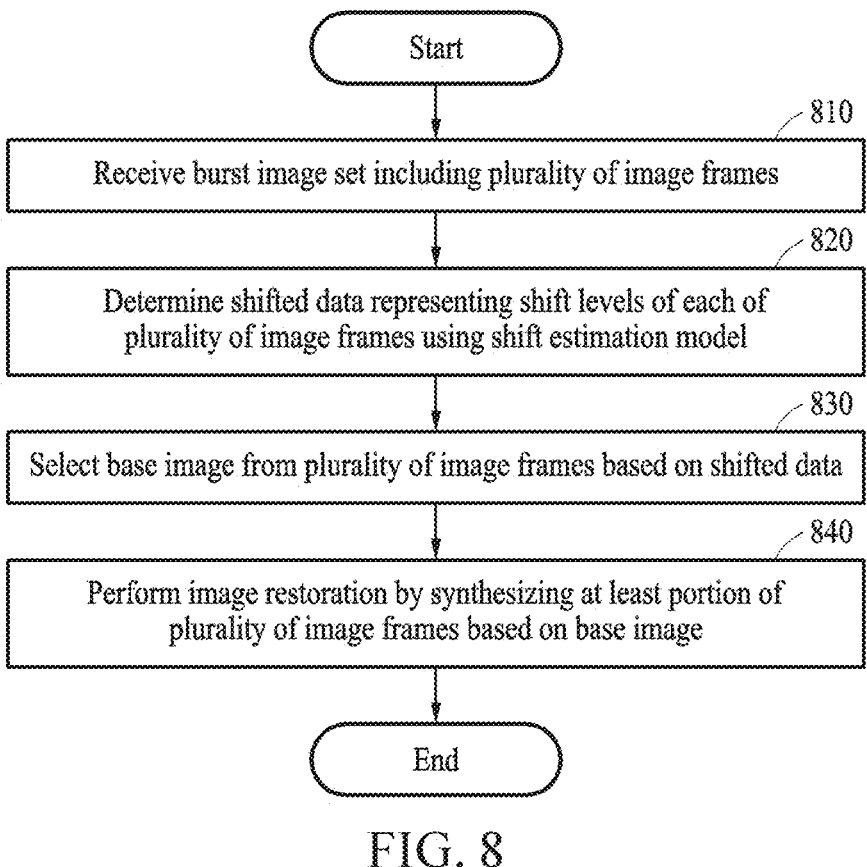
FIG. 8 illustrates an example of an image restoration method using a burst image set.

FIG. 8 illustrates an example of an image restoration method using a burst image set. The operations of FIG. 8 may be performed in the sequence and manner as shown. However, the order of some operations may be changed, or some of the operations may be omitted, without departing from the spirit and scope of the shown example. Additionally, operations illustrated in FIG. 8 may be performed in parallel or simultaneously. One or more blocks of FIG. 8, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., image restoration apparatus 900 of FIG. 9). In addition to the description of FIG. 8 below, the descriptions of FIGS. 1-7 and 9-10 are also applicable to FIG. 8.

Referring to FIG. 8, in operation 810, an image restoration apparatus may receive a burst image set including a plurality of image frames. In operation 820, the image restoration apparatus may determine shifted data representing shift levels of each of the plurality of image frames using a shift estimation model. In operation 830, the image restoration apparatus may select a base image from the plurality of image frames based on the shifted data. In operation 840, the image restoration apparatus may perform image restoration by synthesizing at least a portion of the plurality of image frames based on the base image.

Operation 820 may include generating optical flow map sets of a plurality of image frames including a first optical flow map set representing an optical flow between a first image frame of the plurality of image frames and another image frame of the plurality of image frames by using the shift estimation model, determining representative values of the optical flow map sets including a first representative value of the first optical flow map set, and determining the shifted data based on the representative values.

The first optical flow map set may include a plurality of optical flow maps including a first optical flow map representing a first optical flow between a first image frame and a second image frame of the plurality of image frames, and a second optical flow map representing a second optical flow between the first image frame and a third image frame of the plurality of image frames. The determining of the representative values may include determining a first spatial mean value and a second spatial mean value according to spatial averaging according to dimensions of the first optical flow map and the second optical flow map, determining a pair-wise averaging result according to pair-wise averaging of the first spatial mean value and the second spatial mean value, and determining the first representative value representing the first image frame among the representative values based on the pair-wise averaging result.

The image restoration apparatus may determine noise data representing a noise level of each of the plurality of image frames by using a noise estimation model. Operation 830 may include selecting the base image from the plurality of image frames based on the shifted data and the noise data. Each of the noise estimation models and the shift estimation model may be based on a neural network.

The image restoration apparatus may determine a degradation score of each of the plurality of image frames based on the shifted data, and configure a synthesis group with a portion of the plurality of image frames based on the degradation score of each of the plurality of image frames. The image restoration apparatus may synthesize the image frames of the synthesis group based on the base image.

The plurality of image frames may include the first image frame and the second image frame, and the first image frame may be selected as the base image. Operation 840 may include generating a first feature map of the first image frame, generating an optical flow between the first image frame and the second image frame, generating a second feature map of the second image frame, generating a second warping result by warping the second feature map with an optical flow, and fusing the first feature map and the second warping result. The performing of the image restoration may further include predicting a first weight of the first feature map and a second weight of the second feature map, and the fusing of the first feature map and the second warping result may include fusing the first feature map and the second warping result based on the first weight and the second weight.

Figure 9:
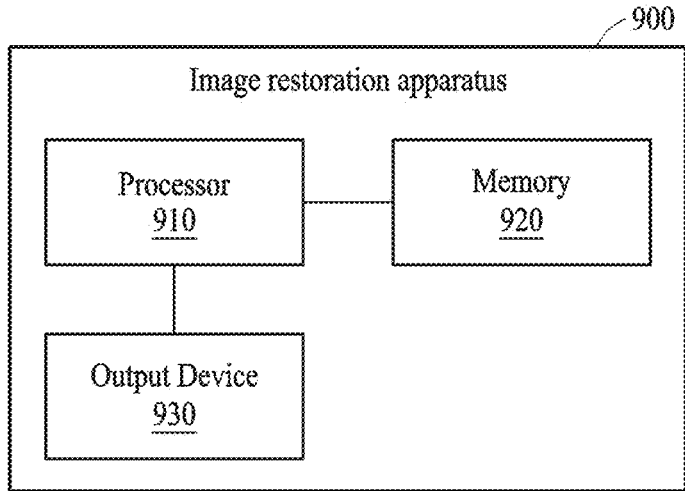
FIG. 9 illustrates an example of a configuration of an image restoration apparatus performing image restoration using a burst image set.

FIG. 9 illustrates an example of an image restoration apparatus performing image restoration using a burst image set. Referring to FIG. 9, an image restoration apparatus 900 may include a processor 910, a memory 920, and an output device 930.

The memory 920 may be connected to the processor 910 and store instructions executable by the processor 910, data to be computed by the processor 910, or data processed by the processor 910. However, this is only an example, and the information stored in the memory 920 is not limited thereto. In an example, the memory 920 may store a program (or an application, or software). The stored program may be a set of syntaxes that are coded and executable by the processor 910 to operate the image restoration apparatus 900. The memory 920 may include a volatile memory or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate Memory (NFGM), a holographic memory, a molecular electronic memory device), or an insulator resistance change memory. Further details regarding the memory 920 are provided below.

The processor 910 may execute the instructions to perform the operations described above with reference to FIGS. 1 to 8, and 10. For example, the processor 910 may receive a burst image set including a plurality of image frames, determine shifted data representing shift levels of each of the plurality of image frames using a shift estimation model, select a base image from the plurality of image frames based on the shifted data, and perform image restoration by synthesizing at least a portion of the plurality of image frames based on the base image.

The processor 910 may control at least one other component of the image restoration apparatus 900 and perform processing of various pieces of data or computations. The processor 910 may control an overall operation of the image restoration apparatus 900 and may execute corresponding processor-readable instructions for performing operations of the image restoration apparatus 900. The processor 910 may execute, for example, software stored in the memory 920 to control one or more hardware components, such as, an image sensor (not shown) of the image restoration apparatus 900 connected to the processor 910 and may perform various data processing or operations, and control of such components.

The processor 910 may read/write neural network data, for example, image data, feature map data, kernel data, biases, weights, for example, connection weight data, hyper-parameters, and other parameters etc., from/to the memory 920 and implement the neural network using the read/written data. When the neural network is implemented, the processor 910 may repeatedly perform operations between an input and parameters, in order to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 910 performs convolution operations with an operation count of up to hundreds of millions to tens of billions, and the frequency at which the processor 910 accesses the memory 920 for the convolution operations rapidly increases.

The processor 910 may be a hardware-implemented data processing device. The hardware-implemented data processing device may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 910 are provided below.

In some examples, the processor 910 may output the restored image through the output device 930. In some examples, the output device 930 may provide an output to a user through auditory, visual, or tactile channel. The output device 930 may include, for example, a speaker, a display, a touchscreen, a vibration generator, and other devices that may provide the user with the output. The output device 930 is not limited to the example described above, and any other output device, such as, for example, computer speaker and eye glass display (EGD) that are operatively connected to the image restoration apparatus 900 may be used without departing from the spirit and scope of the illustrative examples described. In an example, the output device 930 is a physical structure that includes one or more hardware components that provide the ability to render a user interface, output information and speech, and/or receive user input.

In some examples, the image restoration apparatus 900 may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices.

In addition, the description provided with reference to FIGS. 1 to 8, and 10 may apply to the image restoration apparatus 900 of FIG. 9.

Figure 10:
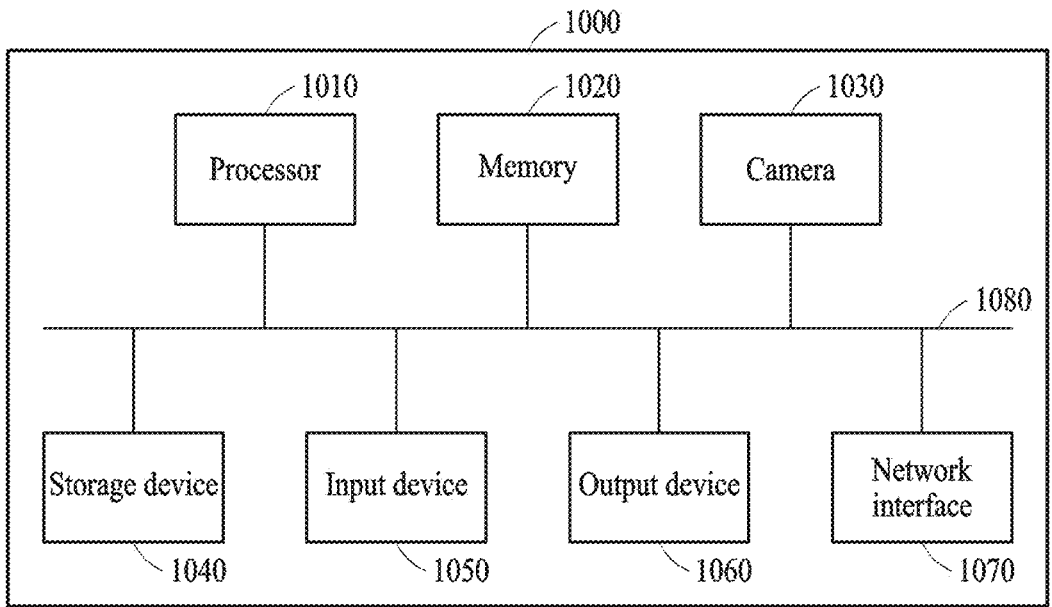
FIG. 10 illustrates an example of an electronic device.

FIG. 10 illustrates an example of an electronic device. Referring to FIG. 10, an electronic device 1000 may include a processor 1010, a memory 1020, a camera 1030, a storage device 1040, an input device 1050, an output device 1060, and a network interface 1070 that may communicate with each other through a communication bus 1080.

For example, the electronic device 1000 may be implemented as at least a part of or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a smart device, a smart TV or a refrigerator, a security device such as a door lock, or a vehicle such as an autonomous vehicle or a smart vehicle. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices. The electronic device 1000 may include, structurally and/or functionally, the image restoration apparatus 900 of FIG. 9.

The description of the processor 910 and memory 920 of FIG. 9 are applicable to the processor 1010 and the memory 1020 illustrated in FIG. 10, respectively, and will not be repeated for brevity.

The camera 1030 may capture a photo and/or record a video. For example, the camera 1030 may generate a burst image set including a plurality of image frames. The storage device 1040 may include a computer-readable storage medium or computer-readable storage device. The storage device 1040 may store a greater amount of information than the memory 1020 and store the information for a long period of time. For example, the storage device may store one or more neural networks. For example, the storage device 1040 may include a magnetic hard disk, an optical disc, a flash memory, a floppy disk, or other non-volatile memories known in the art.

The input device 1050 may receive an input from a user through traditional input methods such as a keyboard and a mouse, and through new input methods such as a touch input, a voice input, and an image input. For example, the input device 1050 may include a keyboard, a mouse, a touch screen, a microphone, or any other device that detects an input from the user and transmits the detected input to the electronic device 1000. The output device 1060 may provide an output of the electronic device 1000 to the user through a visual, auditory, or haptic channel. The output device 1060 may include, for example, a display, a touch screen, a speaker, a vibration generator, or any other device that provides an output to the user. The network interface 1070 may communicate with an external device through a wired or wireless network.

The computing apparatuses, the electronic devices, the processors, the memories, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented image restoration method, comprising:
   receiving a burst image set comprising image frames;
   determining shifted data representing a shift level of each of the image frames based on optical flow map sets generated using a shift estimation model;
   selecting a base image from the image frames based on the shifted data; and
   performing image restoration by synthesizing at least a portion of the image frames based on the base image.

2. The image restoration method of claim 1, wherein the determining of the shifted data comprises:
   generating the optical flow map sets of the image frames comprising a first optical flow map set representing an optical flow between a first image frame of the image frames and another image frame of the image frames using the shift estimation model;
   determining representative values of the optical flow map sets comprising a first representative value of the first optical flow map set; and
   determining the shifted data based on the representative values.

3. The image restoration method of claim 2, wherein the first optical flow map set comprises:
   optical flow maps comprising a first optical flow map representing a first optical flow between the first image frame and a second image frame of the image frames, and a second optical flow map representing a second optical flow between the first image frame and a third image frame of the image frames.

4. The image restoration method of claim 3, wherein the determining of the representative values comprises:
   determining a first spatial mean value and a second spatial mean value according to spatial averaging of dimensions of the first optical flow map and the second optical flow map, respectively;
   determining a pair-wise averaging result according to pair-wise averaging of the first spatial mean value and the second spatial mean value; and
   determining a first representative value representing the first image frame from among the representative values based on the pair-wise averaging result.

5. The image restoration method of claim 1, further comprising:
   determining noise data representing a noise level of each of the image frames using a noise estimation model.

6. The image restoration method of claim 5, wherein the selecting of the base image comprises:
   selecting the base image from the image frames based on the shifted data and the noise data.

7. The image restoration method of claim 5, wherein each of the noise estimation model and the shift estimation model is based on a neural network.

8. The image restoration method of claim 1, further comprising:
   determining a degradation score of each of the image frames based on the shifted data; and
   forming a synthesis group with a portion of the image frames based on the degradation score of each of the image frames.

9. The image restoration method of claim 8, wherein the performing of the image restoration comprises:
   synthesizing the image frames of the synthesis group based on the base image.

10. The image restoration method of claim 1, wherein the image frames comprise a first image frame and a second image frame, and the first image frame is selected as the base image, and the performing of the image restoration comprises:

generating a first feature map of the first image frame;

generating an optical flow between the first image frame and the second image frame;

generating a second feature map of the second image frame;

generating a second warping result by warping the second feature map with the optical flow; and fusing the first feature map and the second warping result.

11. The image restoration method of claim 10, wherein the performing of the image restoration further comprises:

determining a first weight of the first feature map and a second weight of the second feature map, and the fusing of the first feature map and the second warping result comprises fusing the first feature map and the second warping result based on the first weight and the second weight.

12. A non-transitory computer-readable storage medium storing instructions that, when executed by a processor, cause the processor to perform the method of claim 1.

13. An image restoration apparatus, comprising:

a processor configured to:

receive a burst image set comprising image frames;

determine shifted data representing a shift level of each of the image frames based on optical flow map sets generated using a shift estimation model;

select a base image from the image frames based on the shifted data; and perform image restoration by synthesizing at least a portion of the image frames based on the base image.

14. The image restoration apparatus of claim 13, wherein, to determine the shifted data, the processor is further configured to:

generate the optical flow map sets of the image frames comprising a first optical flow map set representing an optical flow between a first image frame of the image frames and another image frame of the image frames using the shift estimation model;

determine representative values of the optical flow map sets comprising a first representative value of the first optical flow map set; and determine the shifted data based on the representative values.

15. The image restoration apparatus of claim 14, wherein the first optical flow map set comprises:

optical flow maps comprising a first optical flow map representing a first optical flow between the first image frame and a second image frame of the image frames, and a second optical flow map representing a second optical flow between the first image frame and a third image frame of the image frames.

16. The image restoration apparatus of claim 15, wherein, to determine the representative values, the processor is further configured to:

determine a first spatial mean value and a second spatial mean value according to spatial averaging of dimensions of the first optical flow map and the second optical flow map, respectively;

determine a pair-wise averaging result according to pair-wise averaging of the first spatial mean value and the second spatial mean value; and determine a first representative value representing the first image frame from among the representative values based on the pair-wise averaging result.

17. The image restoration apparatus of claim 13, wherein the processor is further configured to:

determine noise data representing a noise level of each of the image frames using a noise estimation model; and select the base image from the image frames based on the shifted data and the noise data.

18. An electronic device, comprising:

a sensor configured to generate a burst image set comprising image frames; and a processor configured to:

determine shifted data representing a shift level of each of the image frames based on optical flow map sets generated using a shift estimation model;

select a base image from the image frames based on the shifted data; and perform image restoration by synthesizing at least a portion of the image frames based on the base image.

19. The electronic device of claim 18, wherein, to determine the shifted data, the processor is further configured to:

generate the optical flow map sets of the image frames comprising a first optical flow map set representing an optical flow between a first image frame of the image frames and another image frame of the image frames using the shift estimation model;

determine representative values of the optical flow map sets comprising a first representative value of the first optical flow map set; and determine the shifted data based on the representative values.

20. The electronic device of claim 19, wherein the first optical flow map set comprises:

optical flow maps comprising a first optical flow map representing a first optical flow between the first image frame and a second image frame of the image frames, and a second optical flow map representing a second optical flow between the first image frame and a third image frame of the image frames, and determine the representative values, the processor is further configured to:

determine a first spatial mean value and a second spatial mean value according to spatial averaging of dimensions of the first optical flow map and the second optical flow map, respectively;

determine a pair-wise averaging result according to pair-wise averaging of the first spatial mean value and the second spatial mean value; and determine a first representative value representing the first image frame from among the representative values based on the pair-wise averaging result.

* * * * *